(12) United States Patent
Kim et al.

(10) Patent No.: US 8,027,588 B2
(45) Date of Patent: Sep. 27, 2011

(54) SYSTEMS AND METHODS FOR OPTICAL CARRIER RECOVERY

(75) Inventors: Inwoong Kim, Orlando, FL (US); Guifang Li, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 794 days.

(21) Appl. No.: 12/025,950

(22) Filed: Feb. 5, 2008

(65) Prior Publication Data
US 2009/0196619 A1   Aug. 6, 2009

(51) Int. Cl.
*H04J 14/02* (2006.01)
(52) U.S. Cl. ............................. 398/92; 398/155; 398/157
(58) Field of Classification Search ........... 398/92, 398/155, 157, 160–161, 169–170
See application file for complete search history.

(56) References Cited

U.S. PATENT DOCUMENTS

| | | | |
|---|---|---|---|
| 6,813,447 B2 * | 11/2004 | Ellis et al. | 398/155 |
| 7,369,779 B1 * | 5/2008 | Croussore et al. | 398/176 |
| 2007/0086713 A1 * | 4/2007 | Ingmar et al. | 385/122 |
| 2007/0134002 A1 * | 6/2007 | Arahira | 398/155 |

OTHER PUBLICATIONS

Serland, et al., "Pulsed degenerate optical parametric oscillator based on a nonlinear-fiber Sagnac interferometer", McCormick School of Engineering and Applied Science, NW University, 1998 Optical Society of America, May 15, 1998, vol. 23, No. 10/Optics Letters, p. 795-797.
Croussore, et al., "Demonstration of phase-regeneration of DPSK signals based on phase-sensitive amplification," College of Optics and Photonics UCF, May 30, 2005, vol. 13, No. 11, pp. 3945-3950.
Croussore, et al. "All-optical regeneration of differential phase-shift keying signals based on phase-shift keying signals based on phase-sensitive amplification," Center for Research and Education in Optics and Lasers, UCF, 2004 Optical Society of America, May 18, 2004, pp. 2357-2359.
Kim, et al. "All-Optical Carrier Phase and Polarization Recovery Using a Phase-Sensitive Oscillator," The College of Optics and Photonics, UCF, 2006 Optical Society of America.

* cited by examiner

*Primary Examiner* — Dzung Tran
(74) *Attorney, Agent, or Firm* — Thomas, Kayden, Horstemeyer & Risley, LLP

(57) ABSTRACT

In one embodiment a system and method pertain to generating a pump from a received optical signal, inputting the generated pump into a phase-sensitive oscillator, and amplifying a carrier component of the pump to generate an optical carrier having the same phase and polarity of an optical carrier of the received optical signal.

18 Claims, 6 Drawing Sheets

US 8,027,588 B2

SYSTEMS AND METHODS FOR OPTICAL CARRIER RECOVERY

STATEMENT REGARDING FEDERALLY-SPONSORED RESEARCH OR DEVELOPMENT

This invention was made with Government support under Contract/Grant No. DAAD1702C0097, awarded by the Defense Advanced Research Projects Agency (DARPA). The Government has certain rights in this invention.

BACKGROUND

Coherent optical communication has attracted renewed interest in recent years. In coherent optical communication, an incoming optical signal is combined with a local oscillator signal to generate an interference signal that can be used to detect the data contained in the incoming data signal.

In order for the two signals to properly interfere or "beat," the two signals must be coherent, i.e., have the same frequency, phase, and polarization. In order to produce a coherent local oscillator signal, the phase and polarization of the optical carrier of the incoming optical signal must be recovered. Unfortunately, carrier phase and polarization recovery remains a significant challenge of coherent optical communication. As a result, coherent optical communication is not frequently used.

Although various methods have been proposed for determining the phase and polarization of the optical carrier of incoming signals, such methods have proven to be complex and/or unreliable. Moreover, known methods are incapable of simultaneous recovery of both phase and polarization, further increasing complexity. Therefore, it can be appreciated that it would be desirable to have less complex and/or more reliable systems and methods for optical carrier phase and polarization recovery.

BRIEF DESCRIPTION OF THE DRAWINGS

The disclosed systems and methods can be better understood with reference to the following drawings. The components in the drawings are not necessarily to scale.

DETAILED DESCRIPTION

As described above, desired are less complex and/or more reliable systems and methods for optical carrier phase and polarization recovery, i.e., optical carrier synchronization. As described in the following, such systems and methods can be achieved through use of a phase-sensitive oscillator. More particularly, when the received optical signal is used as a pump for a phase-sensitive oscillator, the optical carrier, and its phase and polarization, can be recovered.

Figure 1:
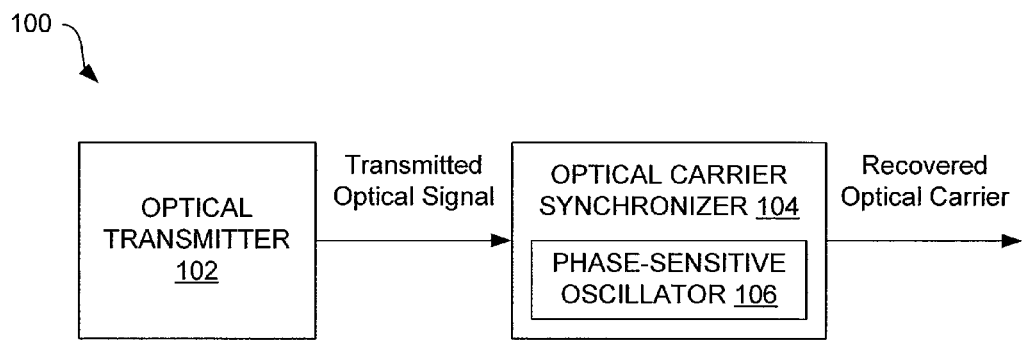
FIG. 1 is a block diagram of an embodiment of a system for optical carrier recovery.

With reference now to the figures, in which corresponding reference numerals identify like components, FIG. 1 is a block diagram of an embodiment for a system 100 for optical carrier phase and polarization recovery. As indicated in FIG. 1, an optical transmitter 102 transmits an optical signal to an optical carrier synchronizer 104, which comprises a phase-sensitive oscillator 106. As described in greater detail below, use of the phase-sensitive oscillator 106 results in a recovered optical carrier being output from the optical carrier synchronizer 104.

Figure 2:
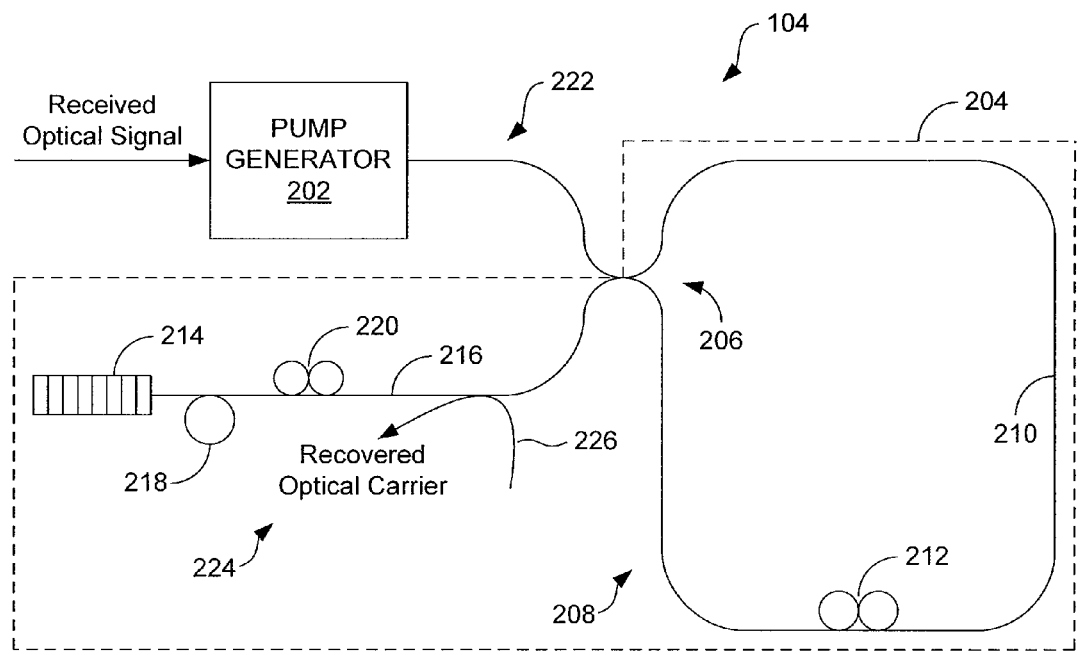
FIG. 2 is a block diagram of an embodiment of an optical carrier synchronizer shown in FIG. 1.

FIG. 2 illustrates an example embodiment for the optical carrier synchronizer 104 shown in FIG. 1. As indicated in FIG. 2, the synchronizer 104 comprises a pump generator 202 that provides a pump signal, or "pump," to a phase-sensitive oscillator 204 via an optical coupler 206. In the embodiment of FIG. 2, the phase-sensitive oscillator 204 includes a phase-sensitive amplifier 208 that generally comprises an nonlinear optical fiber loop 210 (i.e., a nonlinear loop mirror) provided with a polarization controller 212. The phase-sensitive amplifier 208 is configured as a nonlinear optical loop mirror. Notably, the phase-sensitive amplifier 208 may also be considered to include the coupler 206 or a portion thereof. The phase-sensitive oscillator 204 further includes a reflector 214, in the form of a fiber Bragg grating (FBG), that is placed in optical communication with the phase-sensitive amplifier 208 via a further optical fiber 216. Therefore, the phase-sensitive oscillator 204 comprises a nonlinear optical loop mirror (NOLM) and the FBG reflector 214. Provided along the optical fiber 216 is an optical stabilizer 218 and a further polarization controller 220.

In operation, the pump generator 202 is driven by the received optical signal. The pump generator 202 amplifies the received optical signal and outputs the pump onto an upper branch 222 of the phase-sensitive oscillator 204. The pump passes through the coupler 206 and into the optical fiber loop 210 of the phase-sensitive amplifier 208, traverses that loop, and exits the loop via the upper branch of the coupler 206. An optical signal begins to grow from the spontaneous parametric fluorescence in the oscillator 204 formed by the reflector 214 and the phase nonlinear optical loop mirror 208. Specifically, a carrier component of the pump is output along a lower branch 224 of the phase-sensitive oscillator 204 travels along optical fiber 216 to the reflector 214, which reflects the carrier component back into the phase-sensitive amplifier loop 210, at which point the carrier component again traverses the loop and travels back again to the reflector. As can be appreciated from the above, through the combined use of the phase-sensitive amplifier 208 and the reflector 214, the carrier component is repeatedly fed into the phase-sensitive amplifier.

As described below, amplifiers provide the highest gain to the carrier component of the pump when they are operated as phase-sensitive amplifiers. Therefore, within the phase-sensitive oscillator, or cavity, the carrier component grows dominantly because of the gain advantage against other optical frequency components. Because the gain process depends on the polarization of the pump, such that the oscillating carrier in the cavity aligned to the polarization of the pump, the oscillating carrier in the cavity only comprises the recovered carrier from the pump in terms of carrier phase and polarization. This recovery process is called carrier synchronization.

Through the operation of the optical carrier synchronizer 104 described above, the pump is, in essence, the input optical signal. Therefore, only the signal components having the same phase and polarization of the input optical signal are amplified by the phase-sensitive amplifier 208. That is, only the components that are coherent with the input optical signal exhibit gain and the remaining components drop out. Accordingly, in a single operation, an optical carrier automatically results that has both the same phase and polarization of the input optical signal. That optical carrier, i.e., the recovered optical carrier of the input optical signal, can then be output from the phase-sensitive oscillator 204 using a port 226 connected to the lower branch 216 of the oscillator. By way of example, the port 226 draws a small portion, e.g., 5%, of the power of the optical carrier. The recovered optical carrier can then be used as a local oscillator for various purposes, such as homodyne detection, all-optical phase-shift keying (PSK) signal regeneration, characterization of coherent optical signals, and so forth.

Figure 3:
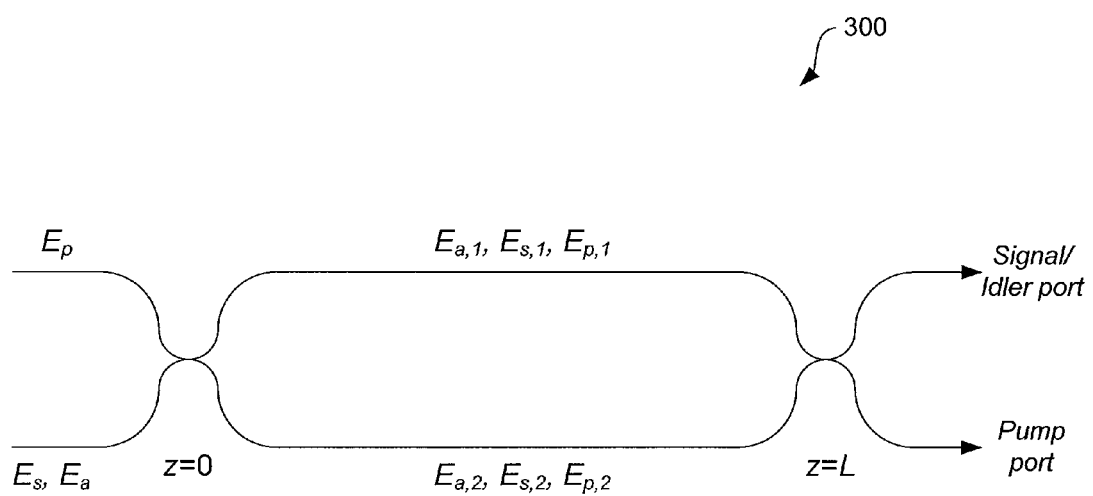
FIG. 3 is a block diagram of an embodiment of a nonlinear Mach-Zehnder interferometer.

The principles underlying the optical carrier synchronizer 104 can be explained with reference to a nonlinear Mach-Zehnder interferometer (NMZI) 300 illustrated in FIG. 3. The NMZI, like the NOLM shown in FIG. 2, utilizes four-wave mixing (FWM) and can provide phase-insensitive (non-degenerate FWM) gain. As a result, when the NMZI (or NOLM) is placed in a cavity to form an oscillator, only the amplification process with a larger small-signal gain or lower pump threshold will oscillate. The small-signal gains for phase-sensitive and phase-insensitive amplification can be found by solving the coupled-mode equations of the electric fields in the NMZI:

$$\frac{dE_{p,n}(z)}{dz} = i\gamma P_{p,n} E_{p,n}(z) \quad \text{(Equation 1)}$$

$$\frac{dE_{s,n}(z)}{dz} = 2i\gamma P_{p,n} E_{s,n}(z) + i\gamma E_{a,n}^*(z) E_{p,n}^2(z) e^{-1\Delta kz}$$

$$\frac{dE_{a,n}(z)}{dz} = 2i\gamma P_{p,n} E_{a,n}(z) + i\gamma E_{s,n}^*(z) E_{p,n}^2(z) e^{-1\Delta kz}$$

where $\gamma$ is the nonlinear coefficient and the subscript n=1 (or 2) indicates the upper (or lower) branch of the NMZI. $E_a$, $E_s$, and $E_p$ are the fields of idler, signal, and pump, respectively. Energy conservation requires that $\Delta\omega = \omega_s - \omega_p = \omega_p - \omega_a$, where $\omega_p$, $\omega_s$, and $\omega_a$ are the angular frequencies of the pump, signal, and idler, respectively. It is assumed that the optical frequencies of the signal and idler are very close to the pump so that $\Delta kL = \beta_2 \Delta\omega^2 L \square 1$, where $\beta_2$ is the group velocity dispersion at $\omega_p$. The initial conditions at z=0 are given by $E_{a,n}(0)=0$, $E_{s,n}(0)=i^{2-n}E_s(0)/\sqrt{2}$, $E_{p,n}(0)=i^{n-1}E_p(0)/\sqrt{2}$, and $P_{p,n}=|E_{p,n}(0)|^2$.

For small-signal gain under the undepleted-pump approximation, the fields at z=L are given by:

$$E_{p,n} = E_{p,n}(0) e^{i\gamma P_{p,n} L}$$

$$E_{s,n} = (1+i\gamma P_{p,n} L) E_{s,n}(0) e^{i\gamma P_{p,n} L}$$

$$E_{a,n} = -i\gamma P_{p,n} L E_{s,n}(0) e^{-2i(\phi_{s0}-\phi_{p0})} e^{i\gamma P_{p,n} L} \quad \text{(Equation 2)}$$

where $\phi_{po}$ and $\phi_{so}$ are the initial phases of the pump $E_p(0)$ and the signal $E_s(0)$, respectively. The electric fields at the signal output port just after the 3-dB coupler (z=L) are given by $$E_s(L) = |E_s(O)| e^{i(\varphi_{po}+\gamma P_p L/2)}\left(1+\frac{1}{2}i\gamma P_p L\right) e^{i(\varphi_{so}-\varphi_{po})} \quad \text{(Equation 3)}$$

$$E_a(L) = |E_s(O)| e^{i(\varphi_{po}+\gamma P_p L/2)}\left(\frac{1}{2}\gamma P_p L\right) e^{i(\varphi_{so}-\varphi_{po})}$$

From Equation 3, the small-signal gain of the signal $E_s$ for phase-insensitive amplification is $1+G^2$, where $G=(\frac{1}{2})\gamma P_p L = (\frac{1}{2})\gamma |E_p(0)|^2 L$.

The small-signal gain of the phase-sensitive amplification process can be found from Equation 3 by setting the signal and idler optical frequency to be the same (degenerate FWM process). The sum of the two fields in Equation 3, which is now the output signal for the degenerate case, is:

$$E_s(L) = ie^{i\gamma P_p L/2}(|E_s(0)|e^{i\phi_{s0}} + \phi_{NL}|E_p(0)|e^{i\phi_{p0}}) \quad \text{(Equation 4)}$$

where the phase-sensitive nonlinear phase shift $\Phi_{NL}$ is $\gamma L |E_p(0)| \|E_s(0)| \sin(\phi_{po}-\phi_{so})$. The phase-sensitive amplifier is an amplifier based on this phase-sensitive amplification process. From Equation 4, the maximum small-signal gain is given by $1+2G^2+2G\sqrt{1+G^2}$ when the initial phase difference between the pump and signal is $\pi/2$ or $3\pi/2$. The phase-sensitive gain is larger than phase-insensitive gain. Therefore, when the NMZI/NOLM is placed in the cavity to form an oscillator, the phase-sensitive amplification process is dominant because it has a lower pump threshold. At the same time, the polarization of the oscillating signal is aligned to the pump since FWM is polarization sensitive.

From Equation 4, it is observed that the phase-sensitive amplifier gain has a two-fold symmetry with respect to the pump phase. Specifically, the output signal $E_s(L)$ has the same output phase and amplitude for the pump phases of $\phi_{po}$ and $\phi_{po}+\pi$. Therefore, a continuous-wave (CW) signal can be amplified by the phase-sensitive amplifier with either a CW pump or a data-modulated binary PSK (BPSK) pump.

Figure 4:
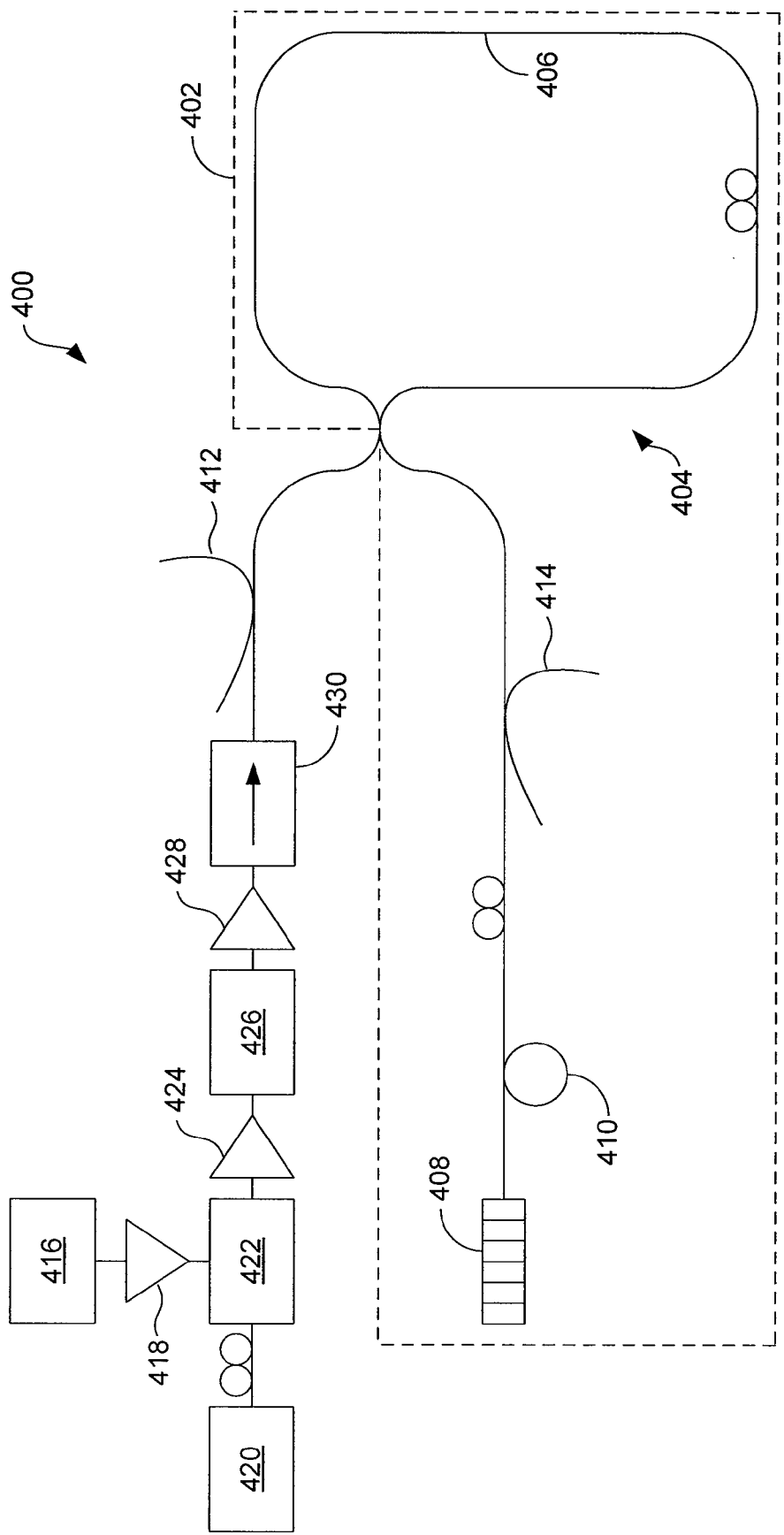
FIG. 4 is a block diagram of an example experimental system incorporating a phase-sensitive oscillator shown in FIG. 2.

Experiments were performed to confirm the viability of the optical carrier phase and polarization recovery using the methodology described above in relation to FIGS. 2 and 3. In the experiment, the system 400 shown in FIG. 4 was used. As indicated in FIG. 4, the system 400 included a phase-sensitive oscillator 402 having the configuration shown in FIG. 2. The phase-sensitive amplifier 404 of the phase-sensitive oscillator 402 comprised a bismuth-oxide-based nonlinear fiber (Bi-NLF) 406 having a nonlinear coefficient of ~1200/kmW and a length of ~5.5 m. A cavity was formed using an FBG 408 having a 3-dB bandwidth of 3.3 GHz as an end mirror. The cavity length including the phase-sensitive amplifier 404 was less than 20 m, and the total insertion loss of the Bi-NLF patch (including spliced points) was approximately 7 dB. Stabilization was achieved using a fiber stretcher 410 by monitoring the output power. Ports 412 and 414 were used to monitor the pump and the recovered optical carrier, respectively. The pump threshold for the phase-sensitive oscillator 402 was approximately 2 W.

The system 400 further comprised a radio frequency (RF) pattern generator 416, an RF amplifier 418, a transmitter laser 420, a phase modulator 422, and an optical amplifier 424. Together, those components simulated a transmitter that generated a phase-modulated optical signal that simulated an incoming optical signal. In addition, the system 400 comprised a band-pass filter 426 that removed amplified spontaneous emission (ASE) noise, a further optical amplifier 428 that further amplified the signal, and an optical isolator 430 that prevented backward propagation of optical signals. Together, those components performed the function of a pump generator driven by the received optical signal.

Figure 5A:
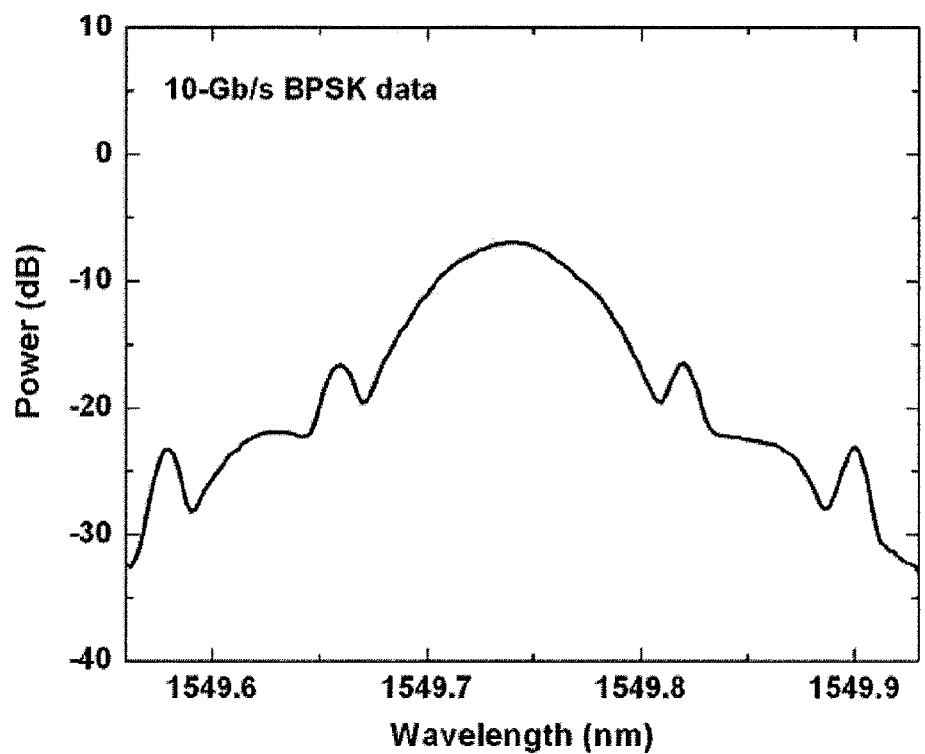
FIG. 5A is a graph of an optical spectrum of a pump used in the system of FIG. 4.
Figure 5B:
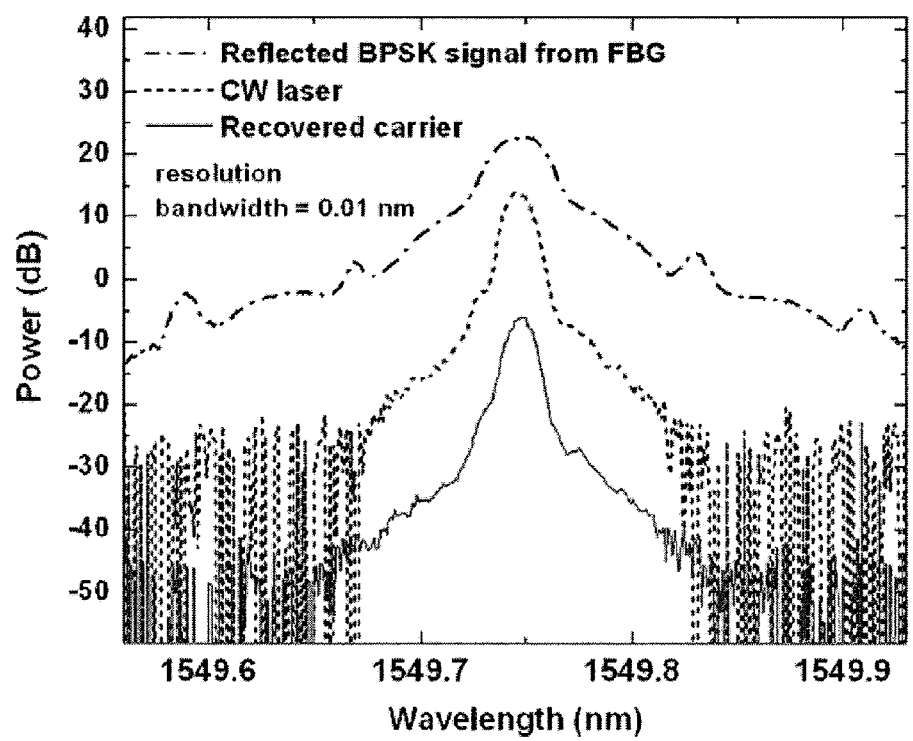
FIG. 5B is a graph of optical spectra of a transmitter laser (CW), a recovered optical carrier, and a binary phase-shift keying signal that resulted from the system of FIG. 4.

Pseudorandom 10-Gb/s BPSK data of length $2^{15}-1$ with an average power of 2 W was used as the pump. The optical spectrum of the pump is shown in FIG. 5A, which does not have the optical carrier component as expected. FIG. 5B shows the optical spectra of the transmitter laser (CW), the recovered optical carrier, and the BPSK signal reflected from the FBG but without the cavity. The spectral profile of the recovered optical carrier is clearly closer to that of the transmitter laser than that of the reflected BPSK signal.

Figure 6A:
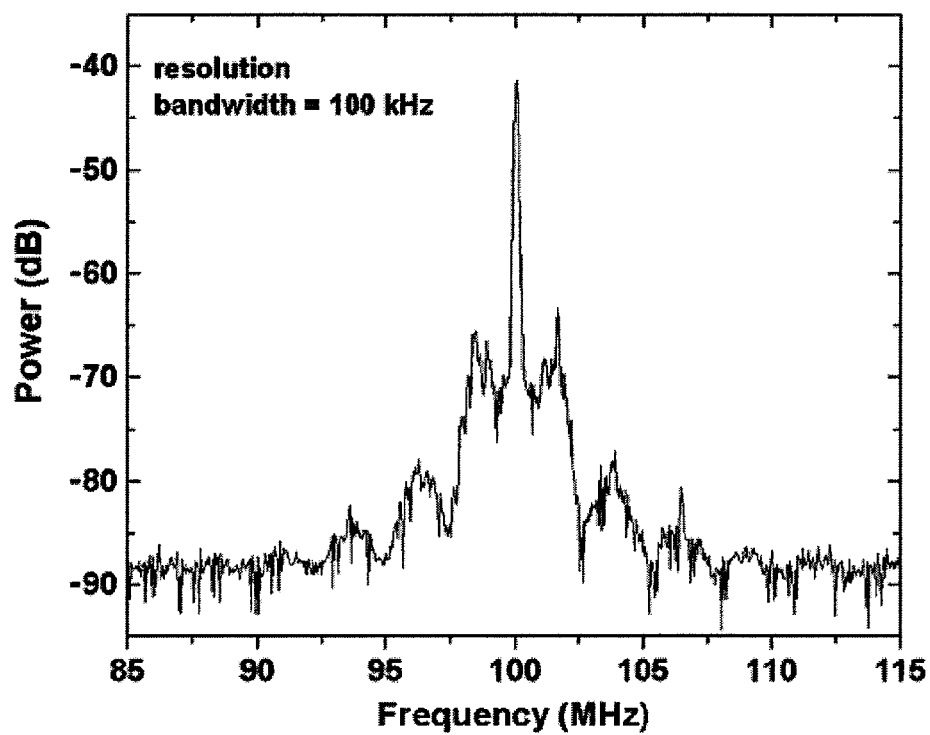
FIG. 6A is a graph of a self-heterodyne signal of a transmitter laser used in the system of FIG. 4.
Figure 6B:
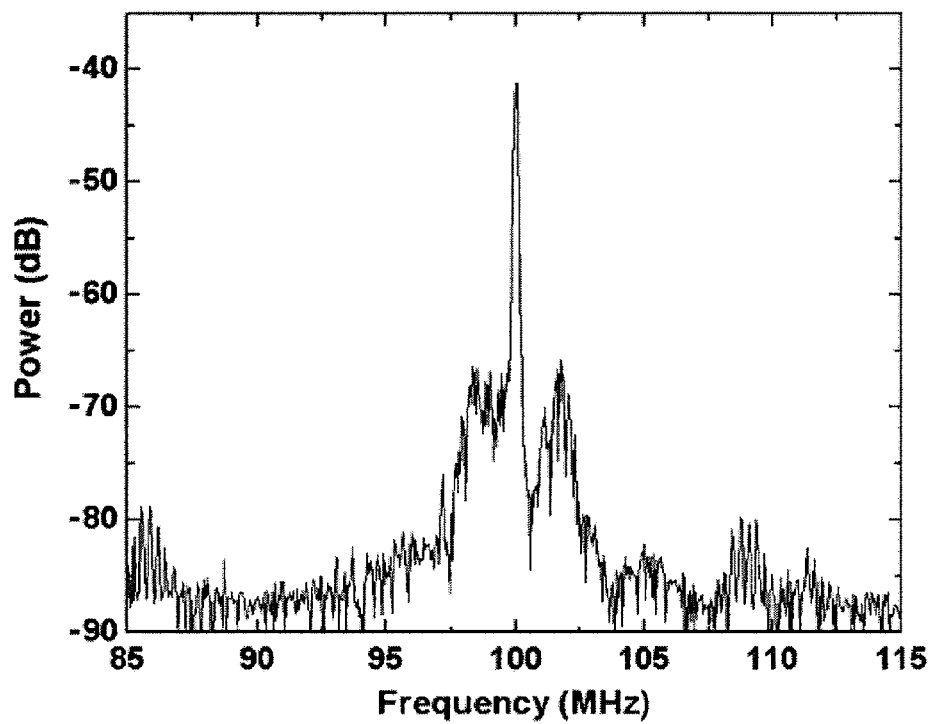
FIG. 6B is a graph of a heterodyne signal between the 100 Mhz-shifted transmitter laser and an optical carrier recovered using the system of FIG. 4.
Figure 7:
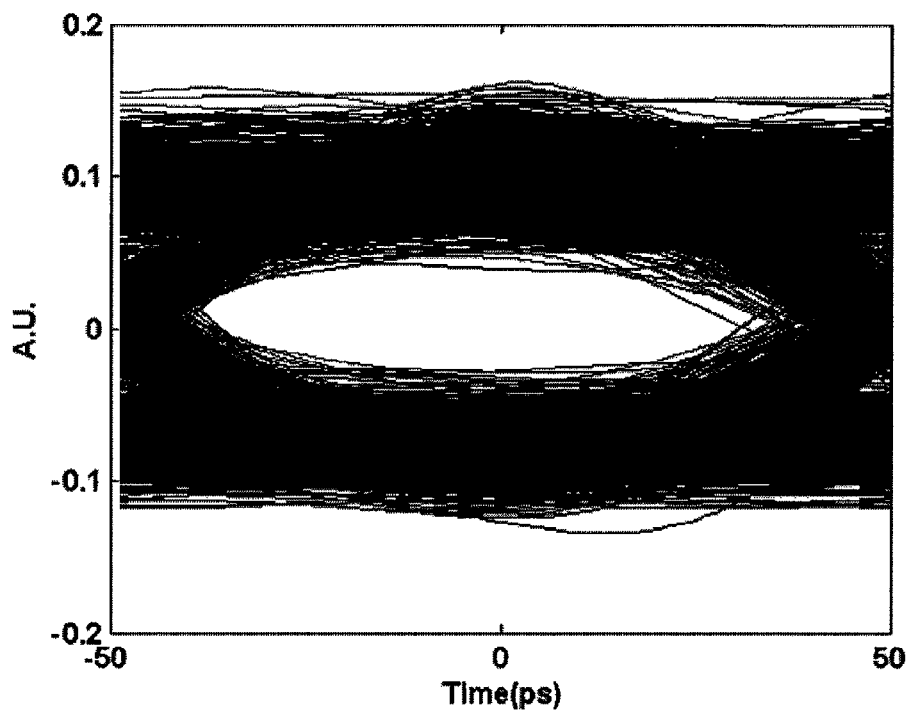
FIG. 7 is an eye diagram of a homodyne-demodulated signal that resulted from the system of FIG. 4.

To verify that optical carrier-phase recovery was achieved, the RF spectra of optical heterodyned signals were measured. FIG. 6A shows the RF spectrum of the optical self-heterodyne signal of the transmitter laser frequency-shifted by 100 MHz (using an AO modulator) and the transmitter laser itself. FIG. 6B is the heterodyne signal between the recovered carrier and the transmitter laser frequency-shifted by 100 MHz. In FIG. 6B, spectral components due to data modulation have been suppressed revealing a noise profile almost identical to that of FIG. 6A. To further verify successful carrier phase recovery, the BPSK signal was demodulated using the recovered carrier as the local oscillator (LO). FIG. 7 shows the resulting homodyne-demodulated eye diagram consisting of 1800 data points. Those results clearly indicate successful all-optical carrier recovery using the phase-sensitive oscillator 304.

Figure 8:
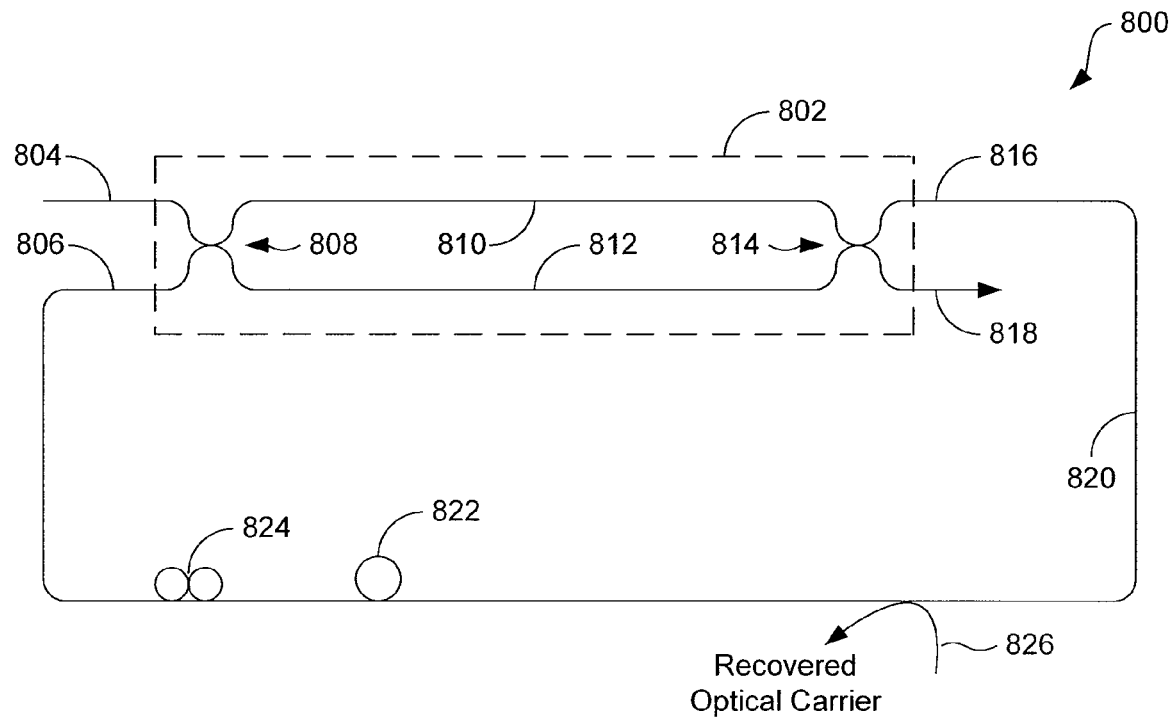
FIG. 8 is a block diagram of an embodiment of an alternative phase-sensitive oscillator that can be used in the optical carrier synchronizer shown in FIG. 1.

FIG. 8 is a block diagram of an alternative embodiment of a phase-sensitive oscillator 800 that can be used in the optical carrier synchronizer 104 of FIG. 1. As indicated in FIG. 8, the phase-sensitive oscillator 800 includes a phase-sensitive amplifier 802 having a configuration similar to the Mach-Zehner interferometer shown in FIG. 3. Therefore, the phase-sensitive amplifier 802 is an nonlinear interferometer-type phase-sensitive amplifier that comprises two input ports 804 and 806, a first optical coupler 808 to which the input ports are coupled, upper and lower branches 810 and 812 of nonlinear optical fiber that are coupled to the first optical coupler, a second optical coupler 814 that is coupled to the upper and lower branches, and two output ports 816 and 818. The output port 816 of the phase-sensitive amplifier 802 connects to a loop 820 of optical fiber. The loop 820 is also coupled to the input port 806 such that signals output from the phase-sensitive amplifier 802 are input back into the phase-sensitive amplifier to form an oscillator. As is further shown in FIG. 8, a stabilizer 822 and a polarization controller 824 are provided along the loop 820.

With the embodiment of FIG. 8, the pump is input into the phase-sensitive amplifier 802 via port 804 and the signal oscillates within the phase-sensitive oscillator 800 thereby generating the optical carrier of the optical signal (e.g., received optical signal) that was used to generate the pump. The recovered optical carrier can then be output on a port 826 also coupled to the loop 820.

The following are claimed:

1. An optical carrier synchronization system comprising:
   a pump generator driven by a received optical signal and configured to generate a pump; and
   a phase-sensitive oscillator configured to receive the pump from the pump generator and amplify a carrier component of the pump to generate an optical carrier having the same phase and polarity of an optical carrier of the received optical signal, wherein the phase-sensitive oscillator comprises a loop of nonlinear optical fiber that functions as a phase-sensitive amplifier and a fiber Bragg grating configured to repeatedly reflect the carrier component from the loop of nonlinear optical fiber back to the loop of nonlinear optical fiber.

2. The system of claim 1, further comprising an optical stabilizer coupled to an optical fiber that extends between the phase-sensitive amplifier and the fiber Bragg grating.

3. The system of claim 1, further comprising a port coupled to the phase-sensitive oscillator from which the generated optical carrier is output.

4. The system of claim 1, wherein the pump generator comprises an optical amplifier configured to amplify the received optical signal and an optical isolator configured to prevent backward propagation of optical signals.

5. An optical carrier synchronization system comprising:
   a pump generator driven by a received optical signal and configured to generate a pump; and
   a phase-sensitive oscillator configured to receive the pump from the pump generator and amplify a carrier component of the pump to generate an optical carrier having the same phase and polarity of an optical carrier of the received optical signal, wherein the phase-sensitive oscillator comprises a phase-sensitive amplifier and a loop of optical fiber that is coupled to an output port and an input port of the phase-sensitive amplifier.

6. The system of claim 5, wherein the phase-sensitive amplifier comprises two branches of nonlinear optical fiber each connected to a first and a second optical coupler, two input ports coupled to the first optical coupler, and two output ports coupled to the second optical coupler.

7. The system of claim 5, further comprising an optical stabilizer coupled to an optical fiber that extends between the phase-sensitive amplifier and the fiber Bragg grating.

8. The system of claim 5, further comprising a port coupled to the phase-sensitive oscillator from which the generated optical carrier is output.

9. The system of claim 5, wherein the pump generator comprises an optical amplifier configured to amplify the received optical signal and an optical isolator configured to prevent backward propagation of optical signals.

10. A method for recovering an optical carrier, the method comprising:
    generating a pump from a received optical signal;
    inputting the generated pump into a phase-sensitive oscillator comprising a loop of nonlinear optical fiber that functions as a phase-sensitive amplifier and a fiber Bragg grating configured to repeatedly reflect the carrier component from the loop of nonlinear optical fiber back to the loop of nonlinear optical fiber; and
    amplifying a carrier component of the pump with the phase-sensitive oscillator to generate an optical carrier having the same phase and polarity of an optical carrier of the received optical signal.

11. The method of claim 10, wherein generating a pump comprises amplifying the received optical signal.

12. The method of claim 10, further comprising stabilizing the pump.

13. The method of claim 10, further comprising receiving the generated optical carrier using a port coupled to the phase-sensitive oscillator.

14. A method for recovering an optical carrier, the method comprising:
    generating a pump from a received optical signal;
    inputting the generated pump into a phase-sensitive oscillator comprising a phase-sensitive amplifier and a loop of optical fiber that is coupled to an output port and an input port of the phase-sensitive amplifier; and
    amplifying a carrier component of the pump with the phase-sensitive oscillator to generate an optical carrier having the same phase and polarity of an optical carrier of the received optical signal.

15. The method of claim 14, wherein the phase-sensitive amplifier comprises two branches of nonlinear optical fiber each connected to a first and a second optical coupler, two input ports coupled to the first optical coupler, and two output ports coupled to the second optical coupler.

16. The method of claim 14, wherein generating a pump comprises amplifying the received optical signal.

17. The method of claim 14, further comprising stabilizing the pump.

18. The method of claim 14, further comprising receiving the generated optical carrier using a port coupled to the phase-sensitive oscillator.

* * * * *